United States Patent
Sanghavi

(10) Patent No.: US 7,822,822 B2
(45) Date of Patent: Oct. 26, 2010

(54) INSTANT MESSAGING SYSTEM CONFIGURED TO FACILITATE EVENT PLAN MANAGEMENT

(75) Inventor: Mehul Kirtikant Sanghavi, Sunnyvale, CA (US)

(73) Assignee: YAHOO! Inc., Sunnyvale, CA (US)

( * ) Notice: Subject to any disclaimer, the term of this patent is extended or adjusted under 35 U.S.C. 154(b) by 753 days.

(21) Appl. No.: 11/550,722

(22) Filed: Oct. 18, 2006

(65) Prior Publication Data
US 2008/0098079 A1   Apr. 24, 2008

(51) Int. Cl.
*G06F 15/16* (2006.01)
(52) U.S. Cl. ...................................................... 709/206
(58) Field of Classification Search .................. 709/207
See application file for complete search history.

(56) References Cited

U.S. PATENT DOCUMENTS

| | | | | |
|---|---|---|---|---|
| 7,280,975 | B1 * | 10/2007 | Donner | 705/10 |
| 2004/0078256 | A1 * | 4/2004 | Glitho et al. | 705/8 |
| 2006/0106774 | A1 * | 5/2006 | Cohen et al. | 707/3 |
| 2006/0291471 | A1 * | 12/2006 | Heuer et al. | 370/395.5 |
| 2007/0101190 | A1 * | 5/2007 | Chen et al. | 714/12 |
| 2007/0226034 | A1 * | 9/2007 | Khan | 705/9 |
| 2008/0016191 | A1 * | 1/2008 | Bijwaard | 709/223 |
| 2008/0040188 | A1 * | 2/2008 | Klausmeier | 705/9 |
| 2008/0046568 | A1 * | 2/2008 | Broda et al. | 709/227 |
| 2008/0279117 | A1 * | 11/2008 | Brisco et al. | 370/259 |

* cited by examiner

*Primary Examiner*—Wing F Chan
*Assistant Examiner*—Tesfay Yohannes
(74) *Attorney, Agent, or Firm*—Weaver Austin Villeneuve & Sampson LLP

(57) ABSTRACT

An instant messaging service is operated in cooperation with an event plan manager system. Information is received regarding a planned event from an instant messaging client with which an event organizer is associated and, based thereon, information is provided indicative of the planned event to the event plan manager system. Information is received from the event plan manager system indicative of the planned event, as maintained by the event plan manager system. Invitation instant messages are caused to be provided to instant messaging clients with which invitees of the planned event are associated, wherein the invitation instant messages are correlated to the information indicative of the planned event as maintained by the event plan manager system.

25 Claims, 4 Drawing Sheets

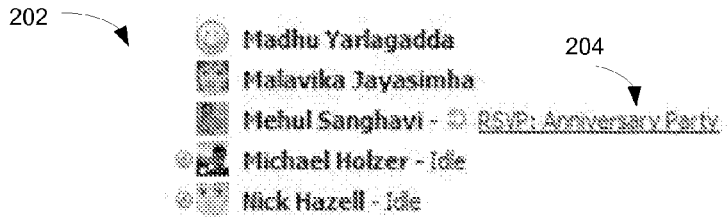
Fig. 2
Fig. 3
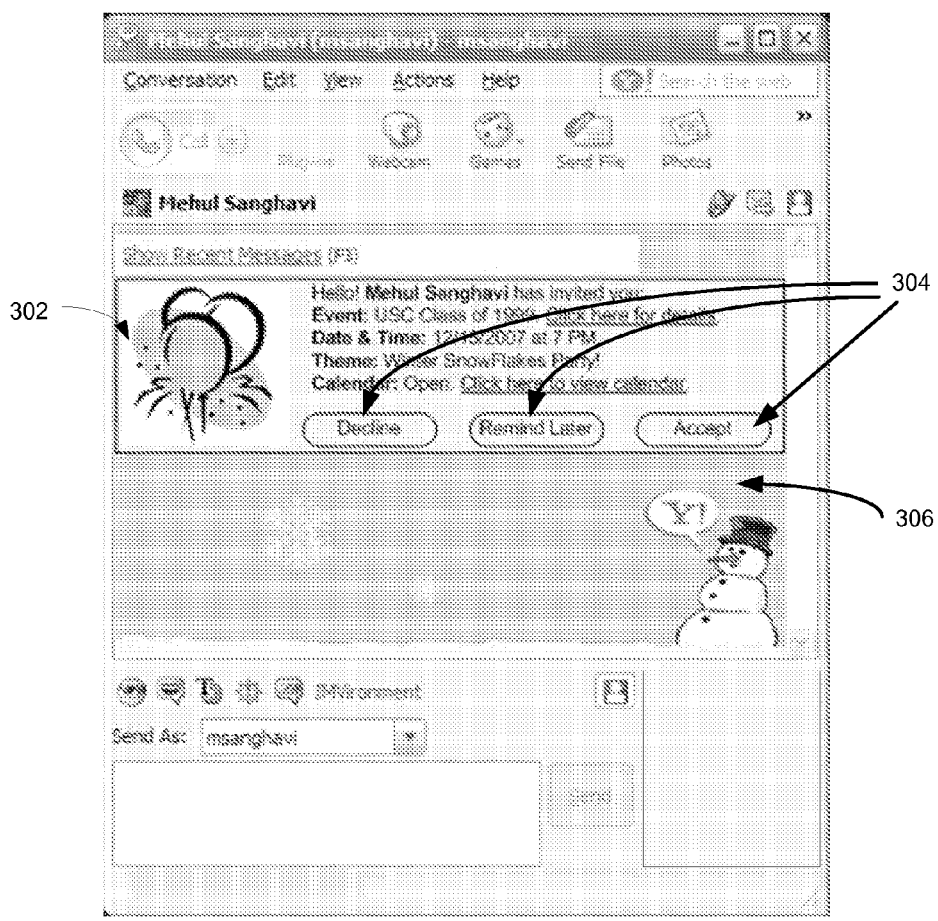

INSTANT MESSAGING SYSTEM CONFIGURED TO FACILITATE EVENT PLAN MANAGEMENT

BACKGROUND

Online event plan managers, such as provided by Evite.com, are becoming more commonly used. Typically, an event organizer provides details of a planned event to the online event plan manager, including time and place of the event, as well as e-mail addresses for the invitees.

The online event manager causes invitations to be e-mailed to the invitees. The invitees respond to the invitation by following a web link embedded in the e-mailed invitation to arrive at a web page of the event manager. The invitee then interacts with the event manager, via the web page and/or other web pages, to indicate whether the invitee will attend the planned event.

SUMMARY

An instant messaging service is operated in cooperation with an event plan manager system. Information is received regarding a planned event from an instant messaging client with which an event organizer is associated and, based thereon, information is provided indicative of the planned event to the event plan manager system. Information is received from the event plan manager system indicative of the planned event, as maintained by the event plan manager system. Invitation instant messages are caused to be provided to instant messaging clients with which invitees of the planned event are associated, wherein the invitation instant messages are correlated to the information indicative of the planned event as maintained by the event plan manager system.

BRIEF DESCRIPTION OF THE DRAWINGS

FIG. 2 illustrates an example of a messenger list that includes an invitation indication.

FIG. 3 illustrates an example of the inline reminder messaging in the context of an invitee interacting with the IM service 102 to cause instant messages to be exchanged with the event organizer.

DETAILED DESCRIPTION

The inventors have realized the efficacy of operating an instant messaging service in cooperation with an event manager. Thus, for example, because of the "instant" nature of instant messaging, feedback regarding planned events may be more readily obtained than via e-mail. In addition, other facilities of the instant messaging service may be useful for accomplishing planning of an event.

In accordance with an example, an instant messaging service is operated in cooperation with an event manager to manage the invitation process, including sending invitations and, in addition, obtaining responses to the invitations. An illustration of an example architecture of such a system is shown in FIG. 1.

Figure 1:
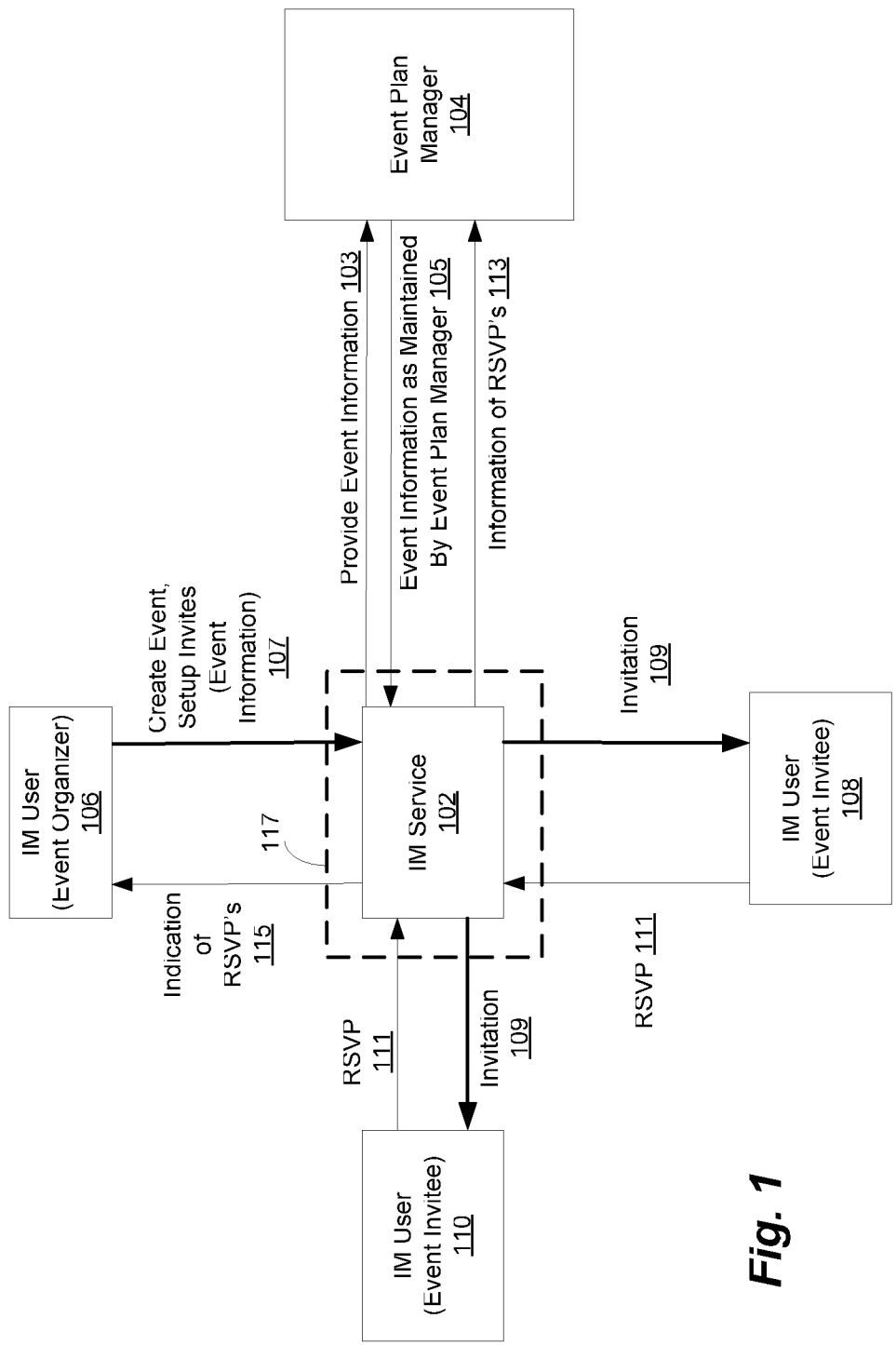
FIG. 1 illustrates an architecture of an instant messaging service configured to be operated in cooperation with an event manager to manage an invitation process, including sending invitations and, in addition, obtaining responses to the invitations.

Referring to FIG. 1, an instant messaging (IM) service 102 operates in cooperation with an event plan manager 104. The event plan manager 104 may be a legacy event planning system that is accessible, for example, via a browser interface. The IM service 102 may be, for example, the Yahoo!® Messenger service.

Referring still to FIG. 1, the IM service 102 is configured to interact with the IM client software 106 of an event organizer to receive a characterization 107 of a planned event. The event organizer is an IM user and, for example, the IM client software 106 may include a plug-in program for use by the event organizer to facilitate providing the characterization 107 of the planned event.

The received characterization 107 includes indications of who are the invitees and the characterization 107 may also include other details, as appropriate to the planned event, for example. For example, if the event is planned to be at a physical location, then the other details may include location and time, among other details. As another example, if the event is planed to be a telephone conference, then the other details may include a call-in number and passcode. As yet another example, if the event is planned to be held online, then the other details may include a URL to the online event, and perhaps a passcode and instructions for pre-registering with the host of the online event.

The invitee indications in the event characterization may be, for example, IM aliases. In some examples, the invitees may include people who are not accessible via the IM service 102. For example, these people may include people who use an IM service that is incompatible with the IM service 102 or people who do not have an IM alias at all. For those people, in general, other identifying information, such as an e-mail address, may be provided so that the invitation may be caused to be sent "offline" by the event plan manager 104.

The IM service 102 provides event planning data 103, corresponding to the event characterization 107, to the event plan manager 104. This event planning data 103 may be provided, for example, via a legacy interface to the event plan manager 104. Based on the provided data, it is expected that the event plan manager 104 creates an event profile. The event profile may be, for example, in a format that is native to the event plan manager 104. In addition, for example, the event profile created by the event plan manager 104 may include an event identification and invitee identifications that are in an internal format maintained by the event plan manager 104 and are not identifications used by the IM service 102 in normal instant messaging.

Information 105 of the event is provided to the IM service 102 from the event plan manager 104 and, based at least in part thereon, the IM service 102 causes invitations 109 to be distributed to IM client applications of invitees (such as example IM client application 108 and example IM client application 110) via an IM protocol. (The IM protocol is indicated in FIG. 1 with the reference numeral 117.) The information 105 of the event provided to the IM service 102 may include, for example, the internal identifications maintained by the event plan manager 104. It may be necessary for the IM service 102 to correlate the internal identifications maintained by the event plan manager 104 back to the identifications (e.g., event indications and invitee indications) used by the IM service 102.

The invitees may interact with respective IM client applications (e.g., IM client applications 108 and 110) such that a response 111 to the invitation 109 is caused by an IM client application to be sent via the IM service 102. (In one example, the response 11 to the invitation 109 is a result of an invitee activating an "accept" or "decline" link in the invitation 109.) Information 113 of the responses is provided from the IM service 102 to the event plan manager 104. In addition, information 115 of the responses may also be provided from the IM service 102 to the IM client software 106 of the event organizer via an IM protocol.

It has been typical that, when an invitation to an event is provided to an invitee, that invitee does not respond to the invitation until soon before the event, if at all. In one example, the IM service 102 is configured such that the messenger list of each invitee includes an indication of each invitation (e.g., in association with the indication of the event organizer) until that invitee has caused an RSVP to be sent. FIG. 2 illustrates an example of a messenger list 202 that includes an invitation indication 204.

The invitation indication serves as a reminder that the RSVP is still outstanding. In another example, the IM service 102 is configured such that inline reminder messaging regarding the invitation (which may include, for example, an indication of the invitation that may be activated) is displayed whenever the invitee interacts with the IM service 102 to cause instant messages to be exchanged with the event organizer.

FIG. 3 illustrates an example of the inline reminder messaging in the context of an invitee interacting with the IM service 102 to cause instant messages to be exchanged with the event organizer. In FIG. 3, the inline reminder messaging 302 includes user interface buttons 304 that may be activated to, in this example, cause actions (e.g., as discussed above) to decline the invitation, accept the invitation, or configure the IM service 102 to cause display of a reminder at a later time. The inline reminder messaging 302 in this example includes a themed environment (e.g., as represented, in part, by the snowman in the portion 306) shown in the conversation area of the IM display. The themed environment may be, for example, an "IMVironment" (also known as an "IMV") as provided by the Yahoo!® Messenger service.

The indication of the invitation may be such that it can be activated by the invitee (e.g., clicked on) to automatically cause an RSVP instant message to be sent or to cause the invitee to again be presented with the invitation. In another example, a voice mail message may be left to which a response may be provided, for example, using interactive voice response. In some examples, the invitation is provided in a custom event/theme based IM environment. In yet other examples, the invitation includes an invitation to a group chat to facilitate collaboration on further setting, refining or adjusting parameters of the planned event.

Figure 4:
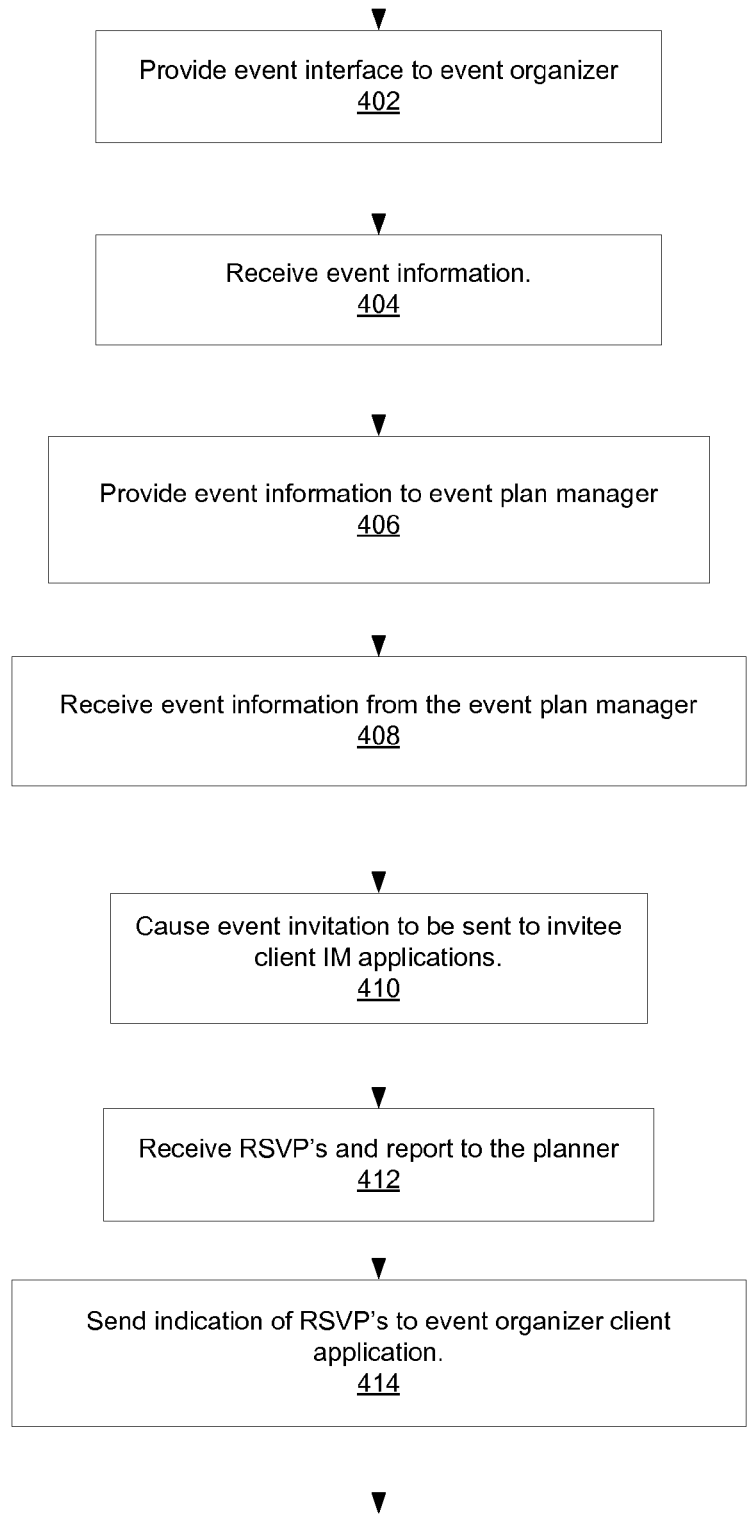
FIG. 4 is a flowchart illustrating an example of the processing, for example, within an IM service, to facilitate event planning.

FIG. 4 is a flowchart illustrating an example of the processing, for example, within the IM service 102, to facilitate event planning. At step 402, an event interface is provided to an IM client of an event organizer. This may be, for example, a result of particular action on the place of the event organizer relative to the IM client. At step 404, the event characterization is received (e.g., by an IM service). At step 406, information of the event characterization is provided to an event plan manager.

At step 408, information of the event as maintained by the event plan manager is provided to the IM service and, at step 410, an invitation is caused to be provided to the instant messaging clients of the invitees via an IM protocol. At step 412, an RSVP is received from an instant messaging client and reported to the event plan manager. Step 412 may include RSVP's being received from the instant messaging clients of more than one of the invitees. At step 414, an indication of RSVP's is provided to the instant messaging client of the event organizer.

The event organizer is initially unsure of what is an appropriate characterization 107 of a planned event. This may be due, for example, to the event organizer being unaware of the desires or scheduling of event invitees. In one example, the IM service is configured to interact with the IM client software of an event organizer to facilitate a group IM-based chat among the event organizer and potential invitees.

Figure 5:
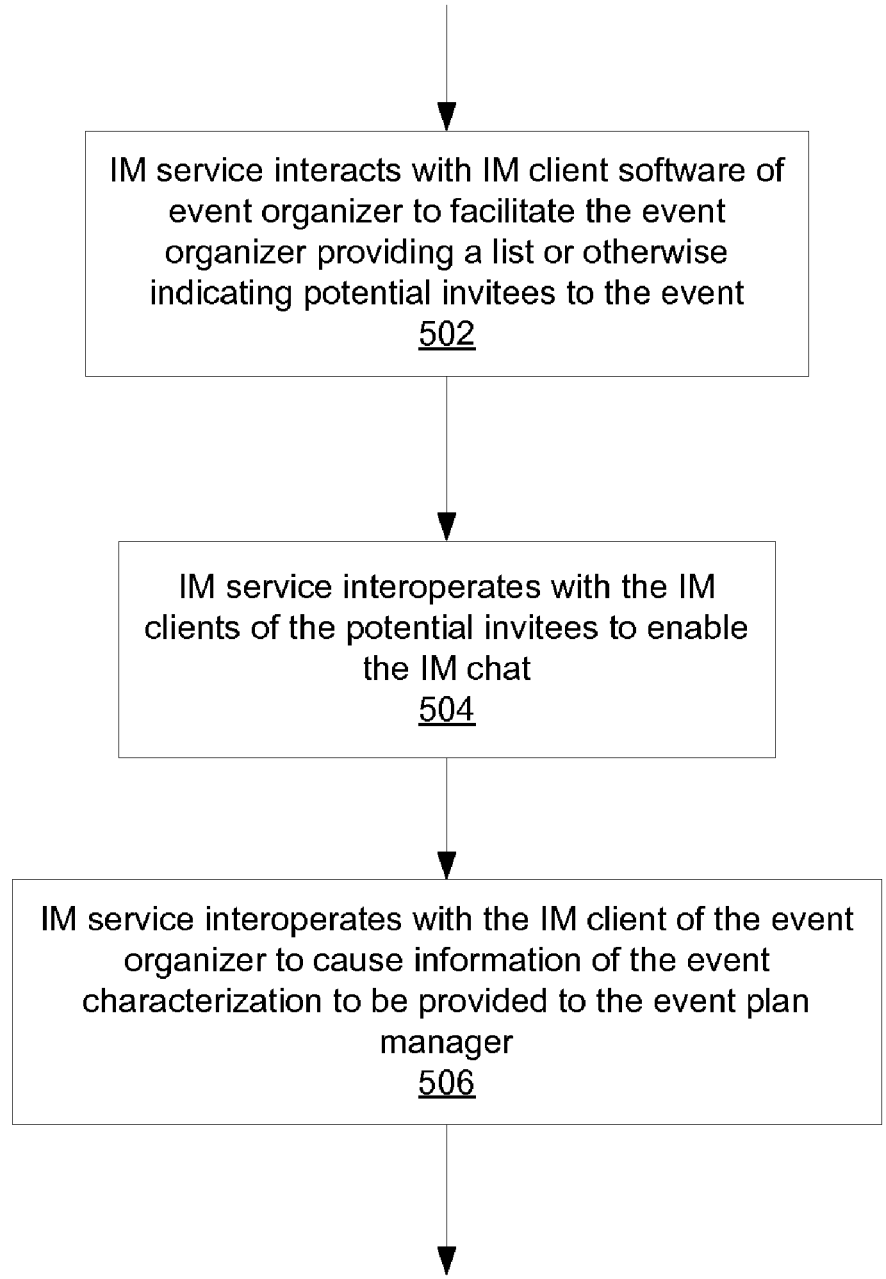
FIG. 5 is a flowchart illustrating processing to accomplish collaboration among an event organizer and potential invitees to determine an appropriate characterization of a planned event.

FIG. 5 is a flowchart illustrating processing to accomplish collaboration among an event organizer and potential invitees to determine an appropriate characterization of a planned event. At step 502, the IM service interacts with the IM client software of the event organizer to facilitate the event organizer providing a list or otherwise indicating potential invitees to the event. At step 504, the IM service interoperates with the IM clients of the potential invitees to enable the IM chat. At step 506, the characterization of the planned event has been determined as a result of the IM chat, and the IM service interoperates with the IM client of the event organizer to cause information of the event characterization to be provided to the event plan manager (e.g., as in step 406 of the FIG. 4 flowchart).

We have described an example in which an instant messaging system is operated in cooperation with an event manager to manage an invitation process, including sending invitations and, in addition, obtaining responses to the invitations.

What is claimed is:

1. A computer-implemented method of operating an instant messaging service in cooperation with an online event plan manager system, wherein the online event plan manager system is configured to employ an email message format to send invitations to users of the online event plan manager system, the method comprising:

receiving information regarding a planned event from an instant messaging client with which an event organizer is associated and, based thereon, providing information indicative of the planned event to the online event plan manager system via a legacy interface associated with the online event plan manager system;

receiving information via the legacy interface from the online event plan manager system indicative of the planned event in a native format as maintained by the event plan manager system; and providing invitation instant messages to instant messaging clients with which invitees of the planned event are associated, wherein the invitation instant messages are correlated to the information in the native format indicative of the planned event, and wherein the invitation instant messages are transmitted to the instant messaging clients in accordance with an instant messaging protocol and an instant message format that is different from the email message format the online event plan manager system is configured to employ.

2. The method of claim 1, further comprising:

receiving response instant messages from at least some of the instant messaging clients with which the invitees of the planned event are associated; and providing an indication of the response instant messages to the online event plan manager system.

3. The method of claim 2, further comprising:

providing an indication of the response instant messages to the instant messaging client with which the event organizer is associated.

4. The method of claim 1, further comprising:
displaying an indication of the planned event in association with an indication of the event organizer as part of an instant messenger frequent contact list of the instant messaging client with which at least one of the invitees is associated.

5. The method of claim 1, further comprising:
providing to the online event plan manager system a signal corresponding to the planned event and at least one of the invitees, based at least in part on receipt of an RSVP signal indicating that the at least one of the invitees has interacted with an associated instant messaging client to indicate intended attendance at the planned event.

6. The method of claim 5, further comprising:
displaying an indication of the planned event in association with an indication of the event organizer as part of an instant messenger frequent contact list of the instant messaging client with which the at least one of the invitees is associated;
wherein the RSVP signal is a result of the at least one of the invitees interacting with the displayed indication of the planned event.

7. The method of claim 1, further comprising:
automatically causing an indication of a response to the invitation by at least one of the invitees to be accessible to the event organizer.

8. The method of claim 1, wherein:
the step of providing invitation instant messages includes providing the invitation instant messages in accordance with a theme associated with the planned event.

9. An instant messaging system configured to operate in cooperation with an online event plan manager system, wherein the online event plan manager system is configured to employ an email message format to send invitations to users of the online event plan manager system, the instant messaging system comprising:
a planned event information receiver configured to receive information regarding a planned event from an instant messaging client with which an event organizer is associated and, based thereon, provide information indicative of the planned event to the online event plan manager system via a legacy interface associated with the online event plan manager system;
an event plan receiver configured to receive information via the legacy interface from the online event plan manager system indicative of the planned event in a native format as maintained by the online event plan manager system; and
an invitation sender configured to provide invitation instant messages to instant messaging clients with which invitees of the planned event are associated, wherein the invitation instant messages are correlated to the information in the native format indicative of the planned event, and wherein the invitation instant messages are transmitted to the instant messaging clients in accordance with an instant messaging protocol and an instant message format that is different from the email message format the online event plan manager system is configured to employ.

10. The instant messaging system of claim 9, further comprising:
an instant message response receiver configured to receive response instant messages from at least some of the instant messaging clients with which the invitees are associated; and
an event plan manager response indication provider configured to provide an indication of the response instant messages to the online event plan manager system.

11. The instant messaging system of claim 10, further comprising:
an instant messaging client response indication provider configured to provide the indication of the response instant messages to the instant messaging client with which the event organizer is associated.

12. The instant messaging system of claim 9, further comprising:
an instant messenger frequent contact list adjuster configured to adjust an instant messenger frequent contact list of the instant messaging clients with which at least some of the invitees are associated to display an indication of the planned event in association with an indication of the event organizer.

13. The instant messaging system of claim 9, further comprising:
an event planning system signal provider configured to provide to the online event plan manager system a signal corresponding to the planned event and at least one of the invitees, based at least in part on receipt of an RSVP signal indicating that the at least one of the invitees as interacted with an associated instant messaging client to indicate intended attendance at the planned event.

14. The instant messaging system of claim 13, further comprising:
an instant messenger frequent contact list adjuster configured to adjust an instant messenger frequent contact list of the instant messaging clients with which at least some of the invitees are associated to display an indication of the planned event in association with an indication of the event organizer;
wherein the RSVP signal is a result of the at least one of the invitees interacting with the displayed indication of the planned event.

15. The instant messaging system of claim 9, further comprising:
a response indicator configured to automatically cause an indication of a response to the invitation instant messages by at least one of the invitees to be accessible to the event organizer.

16. The instant messaging system of claim 9, wherein:
the invitation sender is further configured to provide the invitation instant messages in accordance with a theme associated with the planned event.

17. A computer program product configured to operate an instant messaging service in cooperation with an online event plan manager system, wherein the online event plan manager system is configured to employ an email message format to send invitations to users of the online event plan manager system, the computer program product comprising at least one non-transitory computer-readable storage medium having computer program instructions stored therein which are operable to cause at least one computing device to:
receive information regarding a planned event from an instant messaging client with which an event organizer is associated and, based thereon, provide information indicative of the planned event to the online event plan manager system via a legacy interface associated with the online event plan manager system;
receive information via the legacy interface from the online event plan manager system indicative of the planned event in a native format as maintained by the event plan manager system; and provide invitation instant messages to instant messaging clients with which invitees of the planned event are associated, wherein the invitation instant messages are correlated to the information in the native format indicative of the planned event, and wherein the invitation instant messages are transmitted to the instant messaging clients in accordance with an instant messaging protocol and an instant message format that is different from the email message format the online event plan manager system is configured to employ.

18. The computer program product of claim 17, wherein the computer program instructions further include computer program instructions operable to cause the at least one computing device to:

receive response instant messages from at least some of the instant messaging clients with which the invitees are associated; and provide an indication of the response instant messages to the online event plan manager system.

19. The computer program product of claim 18, wherein the computer program instructions further include computer program instructions operable to cause the at least one computing device to:

provide an indication of the response instant messages to the instant messaging client with which the event organizer is associated.

20. The computer program product of claim 17, wherein the computer program instructions further include computer program instructions operable to cause the at least one computing device to:

display an indication of the planned event in association with an indication of the event organizer as part of an instant messenger frequent contact list of the instant messaging clients with which at least some of the invitees are associated.

21. The computer program product of claim 17, wherein the computer program instructions further include computer program instructions operable to cause the at least one computing device to:

provide to the online event plan manager system a signal corresponding to the planned event and at least one of the invitees based at least in part on receipt of an RSVP signal indicating that the at least one of the invitees has interacted with an associated instant messaging client to indicate intended attendance at the planned event.

22. The computer program product of claim 17, wherein the computer program instructions further include computer program instructions operable to cause the at least one computing device to:

adjust an instant messenger frequent contact list of the instant messaging clients with which at least some of the invitees are associated to display an indication of the planned event in association with an indication of the event organizer;

wherein the RSVP signal is a result of the at least one of the invitees interacting with the displayed indication of the planned event.

23. The computer program product of claim 17, wherein the computer program instructions further include computer program instructions operable to cause the at least one computing device to:

automatically cause an indication of a response instant message to the invitation instant messages by at least one of the invitees to be accessible to the event organizer.

24. The computer program product of claim 17, wherein the computer program instructions further include computer program instructions operable to cause the at least one computing device to:

provide the invitation instant messages in accordance with a theme associated with the planned event.

25. A computer-implemented method of operating an instant messaging service in cooperation with an online event plan manager system, wherein the online event plan manager system is configured to employ an email message format to send invitations to users of the online event plan manager system, the method comprising:

receiving information regarding a planned event from an instant messaging client with which an event organizer is associated and, based thereon, providing information indicative of the planned event to the online event plan manager system via a legacy interface associated with the online event plan manager system, wherein the received information regarding the planned event includes at least an indication of invitees to the planned event and a planned time for occurrence of the planned event;

receiving information via the legacy interface from the online event plan manager system indicative of the planned event, in a native format as maintained by the event plan manager system, wherein the information in the native format indicative of the planned event is based at least in part on the information indicative of the planned event provided to the online event plan manager system from the instant messaging client; and providing invitation instant messages to instant messaging clients with which the invitees of the planned event are associated, wherein the invitation instant messages are correlated to the information in the native format indicative of the planned event and wherein the invitation instant messages are transmitted to the instant messaging clients in accordance with an instant messaging protocol and an instant message format that is different from the email message format the online event plan manager system is configured to employ.

* * * * *